United States Patent [19]

Dimolitsas et al.

[11] Patent Number: 5,802,154
[45] Date of Patent: *Sep. 1, 1998

[54] PROVISION OF PROPRIETARY AND ENHANCED CAPABILITIES IN GROUP 3 FACSIMILE FOR MOBILE SATELLITE COMMUNICATIONS

[75] Inventors: Spiros Dimolitsas, Gaithersburg; Jack H. Rieser, Middletown, both of Md.

[73] Assignee: COMSAT Corporation, Clarksburg, Md.

[*] Notice: The term of this patent shall not extend beyond the expiration date of Pat. No. 5,404,394.

[21] Appl. No.: 303,107

[22] Filed: Aug. 10, 1994

[51] Int. Cl.⁶ .................................................. H04M 11/00
[52] U.S. Cl. .................................... 379/100.17; 358/434
[58] Field of Search ........................... 358/434, 435, 358/436, 438, 439, 442, 443, 426; 379/100, 94, 100.17, 100.01, 100.09, 100.12, 93.14

[56] References Cited

U.S. PATENT DOCUMENTS

| | | |
|---|---|---|
| 5,016,115 | 5/1991 | Calkins ........................... 379/100 |
| 5,150,401 | 9/1992 | Ashby, III et al. . |
| 5,166,977 | 11/1992 | Ross . |
| 5,216,519 | 6/1993 | Daggett et al. ................... 358/434 |
| 5,243,438 | 9/1993 | Anderton et al. ................ 358/426 |
| 5,282,238 | 1/1994 | Berland . |
| 5,404,394 | 4/1995 | Dimolitsas et al. ............. 379/100 |
| 5,488,653 | 1/1996 | Dimolitsas et al. ............. 379/100 |
| 5,587,810 | 12/1996 | Feldman ......................... 379/100 |

OTHER PUBLICATIONS

COMSAT Technical Review, vol. 22, No. 1, Spring 1992, S. Dimolitsas et al: "Real–Time Transmission of Group 3 Facsimile Over Interconnected Public Switched Digital Mobile Satelitte Networks".

Primary Examiner—Stella Woo
Attorney, Agent, or Firm—Sughrue, Mion, Zinn, Macpeak & Seas, PLLC

[57] ABSTRACT

A facsimile communication system including a first communication station for receiving voiceband facsimile signals and for converting the received signals to baseband signals, and for transmitting the baseband signals, and a second communication station for receiving the transmitted baseband signals. The first communication station is able to generate a control code which identifies to the second communication station that the first communication station includes enhanced and/or proprietary capabilities.

34 Claims, 7 Drawing Sheets

PROVISION OF PROPRIETARY AND ENHANCED CAPABILITIES IN GROUP 3 FACSIMILE FOR MOBILE SATELLITE COMMUNICATIONS

FIELD OF THE INVENTION

The present invention is directed to a facsimile communication system, and in particular to Group 3 facsimile mobile communication systems.

BACKGROUND OF THE INVENTION

Group 3 facsimile transmission is currently provided in the Inmarsat system using facsimile interface units (FIUs). The FIU concept was developed to allow "off-the-shelf" facsimile terminals to be interconnected via the Public Switched Telephone Network (PSTN) through Inmarsat's satellite networks, to permit the conversion of Group 3 facsimile point-to-point protocols to point-to-multipoint operation, to compensate for the longer transmission delays encountered in mobile satellite systems, and to allow facsimile call recovery procedures to be successfully concatenated with satellite channel error detection and recovery mechanisms. For a further discussion of facsimile interface units (FIUs), reference is made to the following documents which are incorporated herein by reference: U.S. applications Ser. Nos. 07/720,990, filed Jun. 26, 1991; 07/754,785, filed Sep. 4, 1991; and 07/935,787, filed Aug. 27, 1992.

SUMMARY OF THE INVENTION

The present invention provides a facsimile communication system which includes three extensions of the facsimile interface unit concept discussed above. According to a first embodiment of the invention, the facsimile communication system includes a technique for negotiating in an interoperable and backward compatible manner the availability of enhanced FIU capabilities, such as facsimile compression without necessitating Inmarsat type-approval. According to this embodiment, a "special capabilities control octet" is appended to line control packets used in, for example, the Inmarsat-M, system.

According to a second embodiment of the invention, the transmission delay tolerance of group 3 facsimile terminals are extended through the use of "high speed pacifying" sequences in the Inmarsat-M, Inmarsat-B, Inmarsat-Aeronautical, or other similar systems employing facsimile signal demodulation principles.

The third embodiment of the invention provides a system for improving facsimile call-set up rates during broadcast operation. According to this embodiment, the system disassociates the communication between a fixed earth station and the calling PSTN facsimile terminal from the communication taking place between the mobile earth stations and mobile facsimile terminals. This embodiment of the invention applies to the Inmarsat-M, Inmarsat-B, Inmarsat-Aeronautical systems.

DESCRIPTION OF THE PREFERRED EMBODIMENTS

Group 3 facsimile transmission is currently provided in the Inmarsat system using facsimile interface units (FIUs). As discussed above, the FIU concept was developed to allow "off-the-shelf" facsimile terminals to be interconnected via the PSTN through Inmarsat's satellite networks, to permit the conversion of Group 3 facsimile point-to-point protocols to point-to-point operation, to compensate for the longer transmission delays encountered in mobile satellite systems, and to allow facsimile call recovery procedures to be successfully concatenated with satellite channel error detection and recovery mechanisms.

To perform these functions, the FIUs include two protocols: a Core Protocol, which permits the conversion of the Group 3 facsimile protocols to the mobile service requirements, and a Facsimile Satellite Channel Conversion Protocol, which is used to permit facsimile user data and control signals to be transmitted over Inmarsat's mobile data channels.

Figure 1:
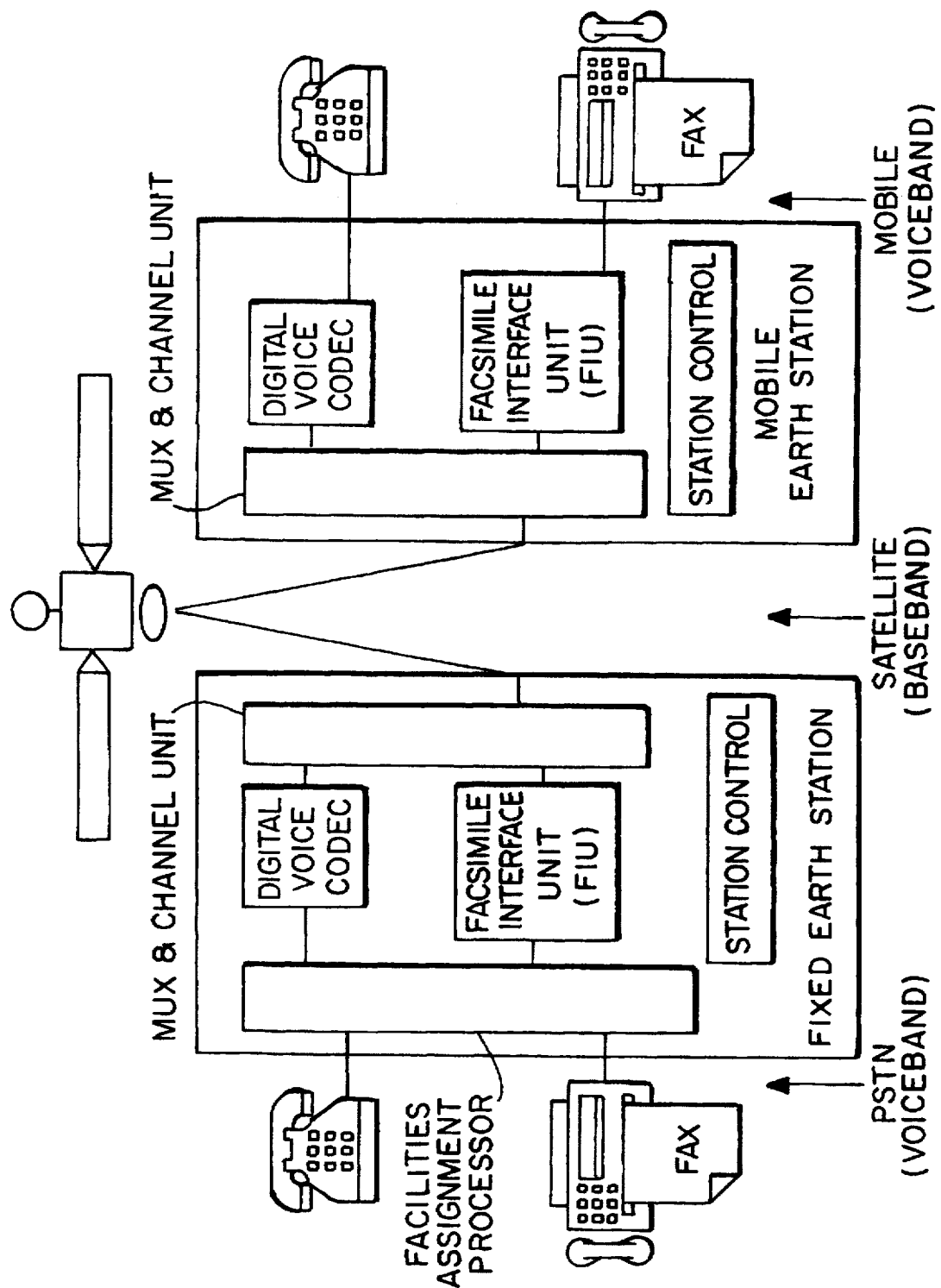
FIG. 1 is a block diagram of a network configuration for facsimile transmission according to an embodiment of the invention.

The transmission of Group 3 facsimile over digital satellite mobile networks requires the conversion of voiceband facsimile signals to baseband waveforms. For the fixed-based facsimile terminal equipment (FTE) customer (i.e., land, coast or ground), the FIU is normally part of Fixed Earth Station (FES) equipment, as shown, for example, in the network configuration of FIG. 1. As shown in FIG. 1, the FES includes a Facilities Assignment Processor, a Digital Voice Codec, a FIU, a Multiplexer (MUX) and Channel Unit and a Station Control Unit. For the mobile (land-mobile, ship, or airborne) customer the FIU is normally part of Mobile Earth Station (MES) equipment. As shown in FIG. 1, the MES also includes a MUX and Channel Unit, a Digital Voice Codec, a Station Control Unit and a FIU.

As a matter of convention, when a signal is being transmitted from the PSTN Facsimile Terminal Unit (FTE) to the Mobile FTE, the Fixed Earth Station (FES) FIU will be called the demodulating FIU and the Mobile Earth Station (MES) FIU will be called the remodulating FIU. Similarly, when a signal is being transmitted in the opposite direction from the Mobile FTE to the PSTN FTE, the FES FIU will be called the remodulating FIU and the MES FIU will be called the demodulating FIU.

The FIUs perform three basic functions. First, FIUs operate on the incoming signal waveforms and convert these from the voiceband to the baseband domain for transmission over the digital satellite channel by demodulating the facsimile voiceband signals in the FTE-to-satellite direction. Subsequently, the FIUs remodulate the digital signals received over the satellite channel, thus converting these received signals from the baseband to the voiceband domain. The FIUs then transmit the voiceband signals to the customer terminal in the satellite-to-FTE direction. Finally, the FIUs perform protocol conversions so that the Group 3 facsimile protocols become compatible with the transport channel constraints of the three basic Inmarsat service configurations.

To perform the protocol conversion functions, the FIUs utilize a predetermined set of conversion procedures. The characteristics of the FIU protocols addressed by the present invention are the following three embodiments:

The identification, demodulation and interpretation of different types of facsimile signals, and their transmission over the satellite channel with associated line state signaling;

The provisions made in order to compensate for the longer access and transport link transmission delays encountered in mobile systems in general, and the Inmarsat system in particular; and The conversion of the CCITT Recommendation T.30 point-to-point protocol characteristics to a point-to-multipoint (or broadcast) operation.

The central feature of the facsimile interface function is the demodulation and identification of the types of different FTE-originated signals, their subsequent treatment and transmission over the satellite channel, and their association with line state signaling packets in the Inmarsat-M system.

The FIUs detect all signals on the incoming telephone channel and demodulate these detected signals when a baseband representation is possible. Such signals include all FTE-to-FTE control signals encoded according to the V.21 modulation scheme and the user image data that are encoded according to the V.29 or V.27ter modulation schemes. The FIUs transmit over the satellite channel only the signals that are unique in facsimile transmissions (i.e, the image data and the information segments of the control signals). Demodulated signals, such as the V.21 signal preamble, that contain significant redundancy are not transmitted, but instead are regenerated (by the re-modulating FIU) in the satellite-to-FTE direction.

The line state signaling is a key characteristic of the FIU concept, since the correct re-modulation of different baseband types of control and image signals cannot be made on the basis of user data alone without the provision of additional information pertaining to the telephone line state associated with these signals.

This line state information is conveyed between Inmarsat-M FIUs in a packetized format. There are seven distinct line states used in the Inmarsat services, as set forth below:

| Line State Control Indication | Telephone Line State |
|---|---|
| Idle: | No signal on the telephone circuit; |
| CED Connection: | 2100 Hz Called Station Identification (CED) signal on the telephone circuit; |
| Binary Coded Signal Connection: | 300 bit/s (non-preamble) binary coded procedural signal on the telephone circuit; |
| Telephone Signaling Tones: | Telephone signaling tones, e.g., ringing tone and busy tone, on the telephone circuit; |
| Synchronizing Signal Connection: | Modem synchronizing (or training) signal on the telephone circuit; |

-continued

| Line State Control Indication | Telephone Line State |
|---|---|
| Preamble Connection: | 300 bit/s binary coded preamble signal on the telephone circuit; and |
| Message Connection | Facsimile message or Training Check TCF signal on the telephone circuit. |

In the Inmarsat-M system, the channel employed for facsimile transmission consists of a 2.4 kbit/s SCPC data channel which is encoded at 8 kbit/s after forward error correction (FEC) and framing. The structure of the Inmarsat-M data channel is illustrated in FIGS. 2(a) and 2(b).

Figure 2A:
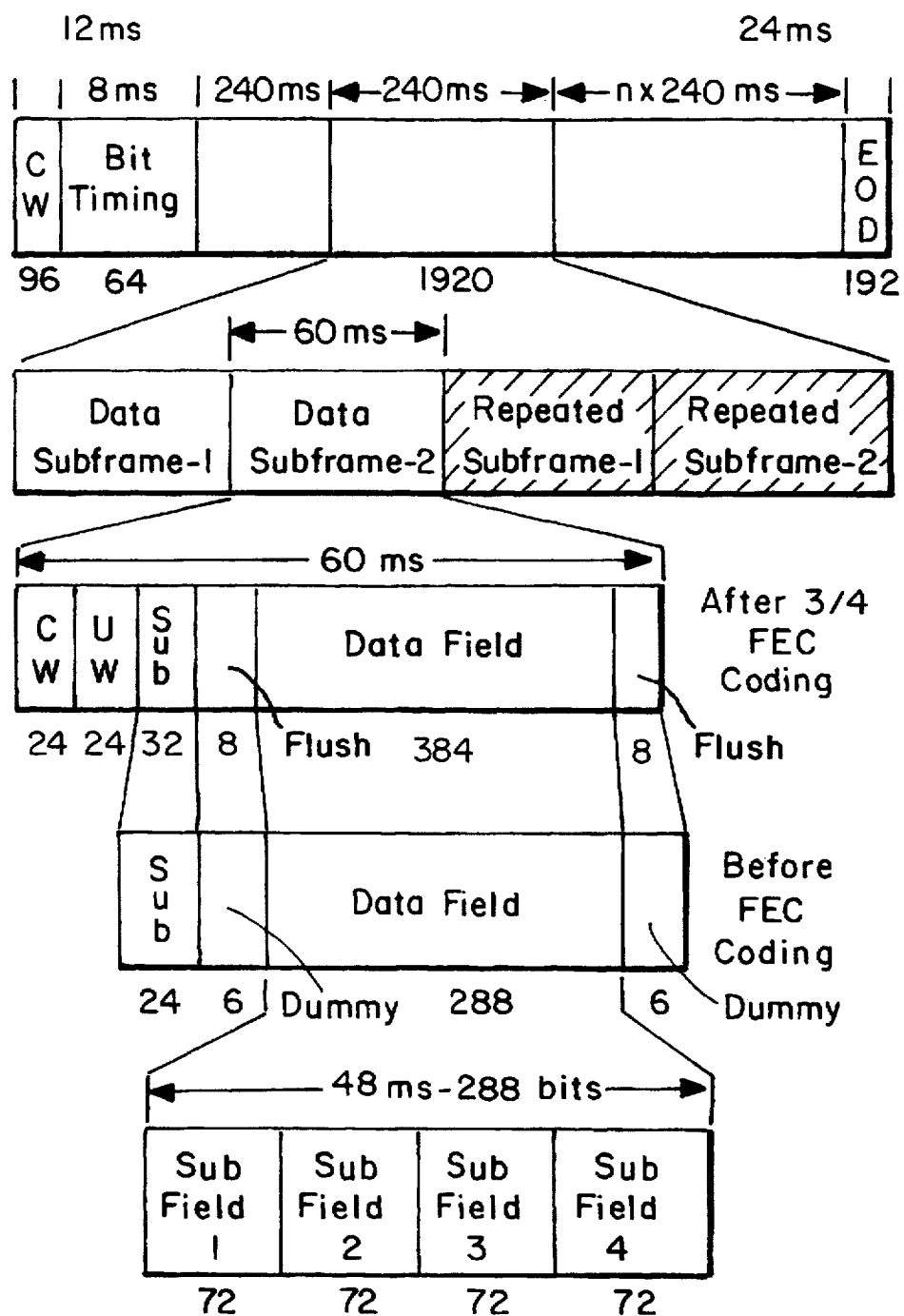
FIGS. 2(a) and 2(b) are illustrative diagrams for showing the structure of a facsimile data channel according to an embodiment of the invention.
Figure 2B:
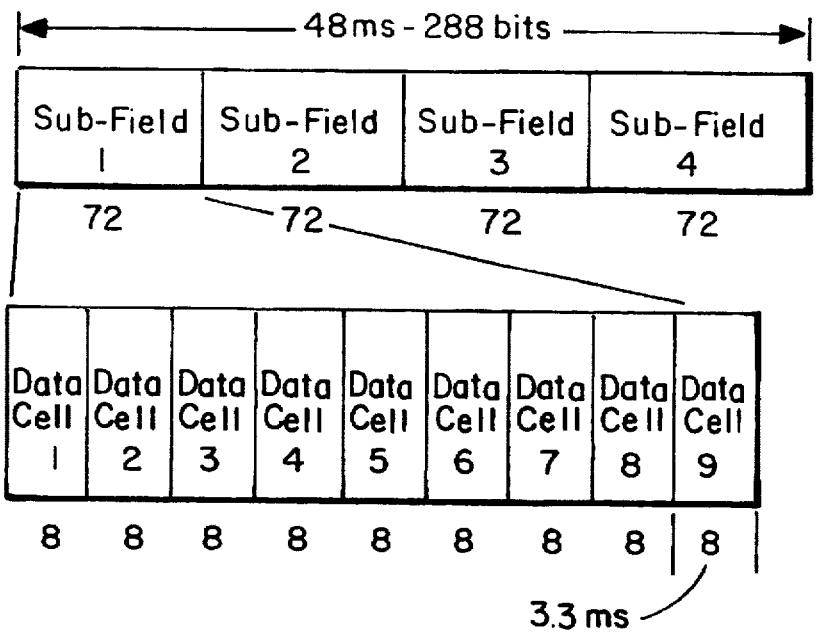

From the sub-field structure of the data channel it can be derived that the FIUs transmit and receive digital signals to and from the satellite in blocks of 72 bits (FIGS. 2(a) and 2(b)). The FIU system internally partitions each of the 72-bit sub-fields into nine 8-bit data cells (FIG. 2(b)).

In the Inmarsat-M service, all 2400 bit/s high speed message signals (i.e., the image information and training check-TCF signals) and all non-preamble signals of the 300 bit/s binary coded procedural signaling are transferred to the distant FIU in the form of a demodulated digital data stream.

Furthermore, the presence of other signals, such as the CED 2100 Hz tone, the V.21 modulated preamble, as well as the idle period present in-between intervals of signal activity is conveyed from the demodulating to the re-modulating FIU by means of line state control codes which are carried in-band over the 2400 bit/s data channel. In such instances, the associated user data sub-fields are filled with a binary all "zero" data.

In the Inmarsat-M system, line-state indications are transmitted over the 2.4 kbit/s data channel as "line control packets". Line control packets are generated wherever a line state transition occurs, and always precede the transmission of information (associated with the new line state) over the digital channel. The indication in the line control packet is then applied to all associated 8-bit data cells of the satellite channel that immediately follow it until a new line control packet is generated.

Figure 3:
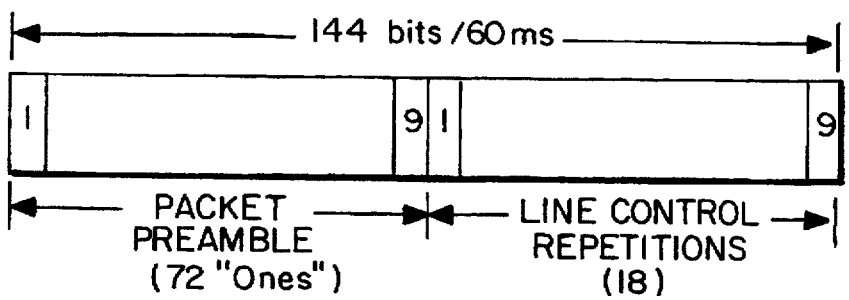
FIG. 3 is an illustrative diagram of an in-band structure of a line control packet.

Because these packets are transmitted in-band over the 2.4 kbit/s data channel, the packets are generated by the demodulating FIU and removed by the re-modulating FIU. The Inmarsat-M line control packets are constructed by utilization of 18 data cells divided into two parts as shown in FIG. 3. The first 9 data cells comprise an all "ones" sequence and are used as a line control preamble to indicate that the following 9 data cells contain line state transition information. The next 9 data cells are comprised of 18 repetitions of an appropriate code for the new line state.

In order to provide a capability to identify FIU systems equipped with enhanced or proprietary capabilities (such as, for example, image compression) the present invention provides a system so that two communicating FIUs can identify each other in a backward compatible manner.

According to the invention, this is accomplished by appending a special capabilities control octet (SCCO) at the end of selected types of line control packets. To clarify this feature of the invention, it should be noted that certain line control packets (such as Idle, Preamble, CED, and Synchronizing Connection) are associated with the regeneration of signals at the demodulating FIU end. For these line controls no user data are transmitted over the satellite channel. Instead, the satellite channel is filled with all binary "zero" data.

Figure 4:
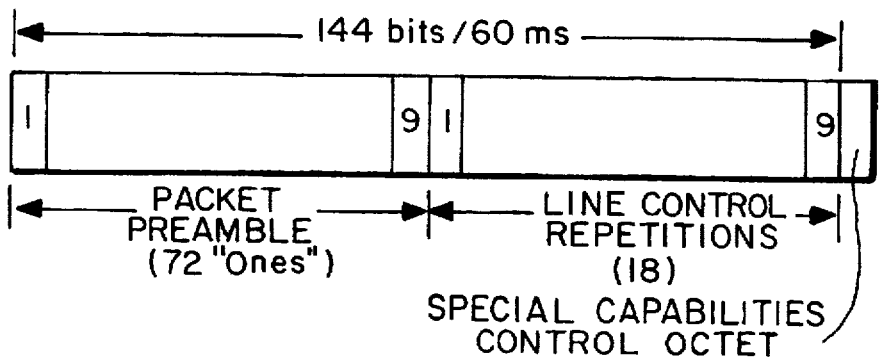
FIG. 4 is an illustrative diagram of a line control packet modified according to the present invention.

In particular, the all binary "zero" structure of the channel can be exploited to transfer a small amount of information (the SCCO) from one FIU to another in an orderly manner. Because the SCCO occupies only a small part of the channel capacity, its presence, to a non-enhanced FIU, will appear as digital transmission impairments (bit errors). However, because the SCCO is uniquely defined, to an enhanced FIU it will appear as an identification code originating from an enhanced FIU system. The structure of this special line control packet is shown in FIG. 4.

The exact contents of the Special Capabilities Control Octet can be defined to be any unique word, with the exception of the binary "00000000".

In addition to the structure of the SCCO, the order employed to complete the identification process must be defined. In the Inmarsat-M system, the FIU associated with the called FTE system will inform the FIU associated with the calling FTE end of its enhanced (or proprietary) capabilities by appending the SCCO to each of the following two line control packets: CED Connection; and Preamble Connection associated with DIS signal.

Following the reception of the two special capabilities control octets, the FIU associated with the calling FTE system will in-turn communicate to the FIU associated with the called FTE of its own enhanced (or proprietary) capability status by appending the SCCO to each of the following two line control packets: Preamble Connection associated with the DCS signal; and Synchronizing Connection associated with the Training check signal (TCF).

The proprietary mode of communication is entered prior to message transmission, so that image compression algorithms can be applied.

In order to compensate for the longer end-to-end delays encountered in the Inmarsat system, signal elements have already been developed with the specific purpose of extending the operating timing tolerances of group 3 facsimile terminals. These signal elements consist of the transmission of a repeated series of 300 bit/s V.21 modulated HDLC "flags" which are sent from a FIU-1 (FIG. 5) to the near-end FTE-1. There are two key characteristics associated with the usage of the flag sequence, namely, the generation and the termination of the sequence.

Figure 5:
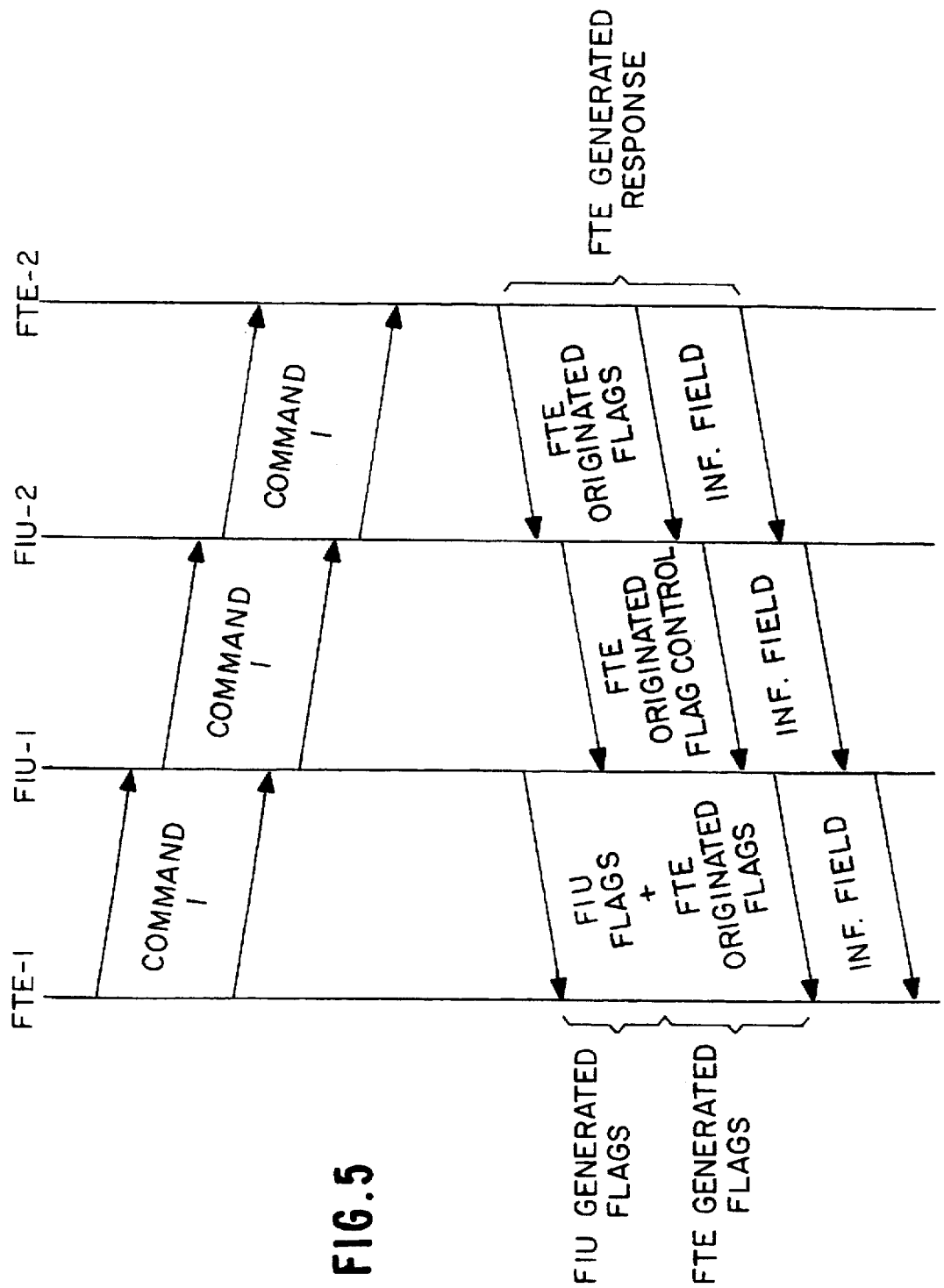
FIG. 5 is an illustrative diagram showing the flag sequence usage.

The flag sequence is generated from FIU-1 whenever an anticipated response from FTE-2 to a command sent by FTE-1 is not received within a prescribed time-out interval. The flag sequence is then terminated whenever either the anticipated signal is received over the satellite channel, or the FIU-1 generated flag sequence has lasted for a prescribed period of time. When the actual FTE-2-generated signal is received over the satellite channel, this is concatenated with the FIU-1 flags so as to appear as one signal to the receiving FTE-1. This process is illustrated in FIG. 5. The flag sequence is only invoked in connection with signals associated with a CCITT Recommendation V.21 modulated preamble. As a result, the flag sequence is not effective for cases with high speed signals (which are modulated according to CCITT Recommendation V.27ter, V.29, V.17, V.33 e.t.c).

According to the second embodiment of the invention, an enhanced "flag" is defined. This enhanced flag may be called, more appropriately, a "high speed pacifier", and comprises a synchronizing sequence followed by the transmission of CCITT Recommendation T.4 "FILL" characters (all binary "zeros").

In particular, an FIU-1 (FIG. 6) expecting to receive a high speed message signal from FTE-2 over the satellite channel initiates the transmission (towards FTE-1) of the modem synchronizing sequence followed by the transmission of "zeros" before the actual signal is received. Once the actual signal is received, this is concatenated with the zeros that have already been transmitted and forwarded to the receiving (called) FTE-1. It should be noted that the synchronizing connection line control indication received over the satellite channel is ignored in this case.

Figure 6:
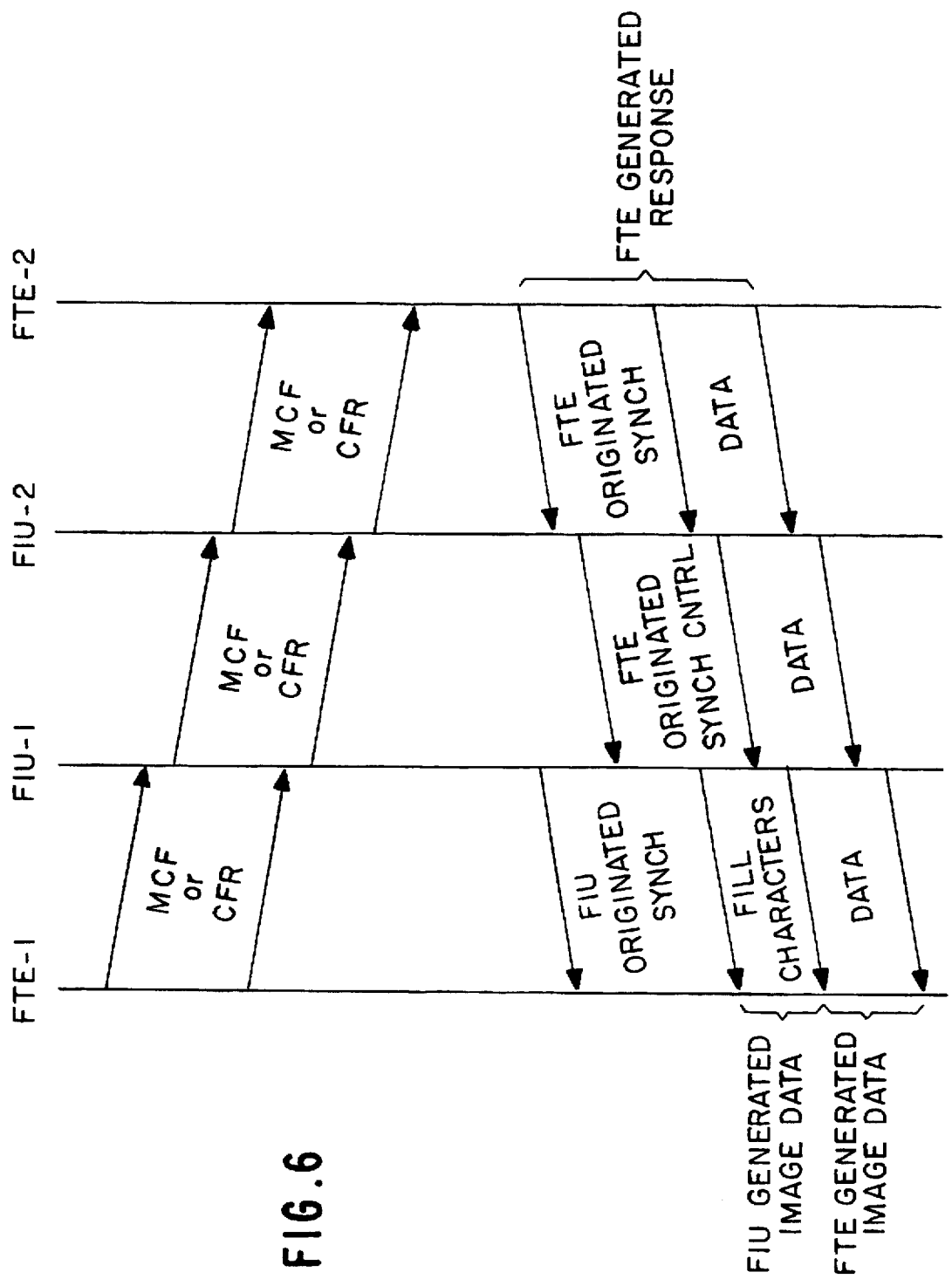
FIG. 6 is an illustrative diagram also showing flag sequence usage.

The process is illustrated in FIG. 6, and this process is applicable in all three pertinent Inmarsat systems: Inmarsat-B, Inmarsat-M, and Inmarsat-Aeronautical. This process is also applicable to other facsimile demodulation based systems including the AMSC and AUSSAT mobile satellite systems, the European GSM digital mobile radio system and other digital cellular systems.

The third embodiment of the invention relates to a broadcast system. According to this third embodiment, a common approach is defined so that the point-to-point CCITT T.30 protocols can be made to operate in a point-to-multipoint mode (broadcasting) for the Inmarsat-B, Inmarsat-M, and Inmarsat-Aeronautical systems. The two key features of these protocols are the following:

The generation of the DIS, Confirmation to Receive (CFR) and Message Confirmation (MCF) signals by the fixed FIU, rather than mobile FTE.

In this process it is thus assumed that the training and image transmissions to the called mobile FTE are always successful.

The precise timing of the responses and length of signals generated by the fixed FIU so that both the fastest as well as the slowest responding mobile FTEs can be synchronized with the transmitting (PSTN) FTE.

Figure 7:
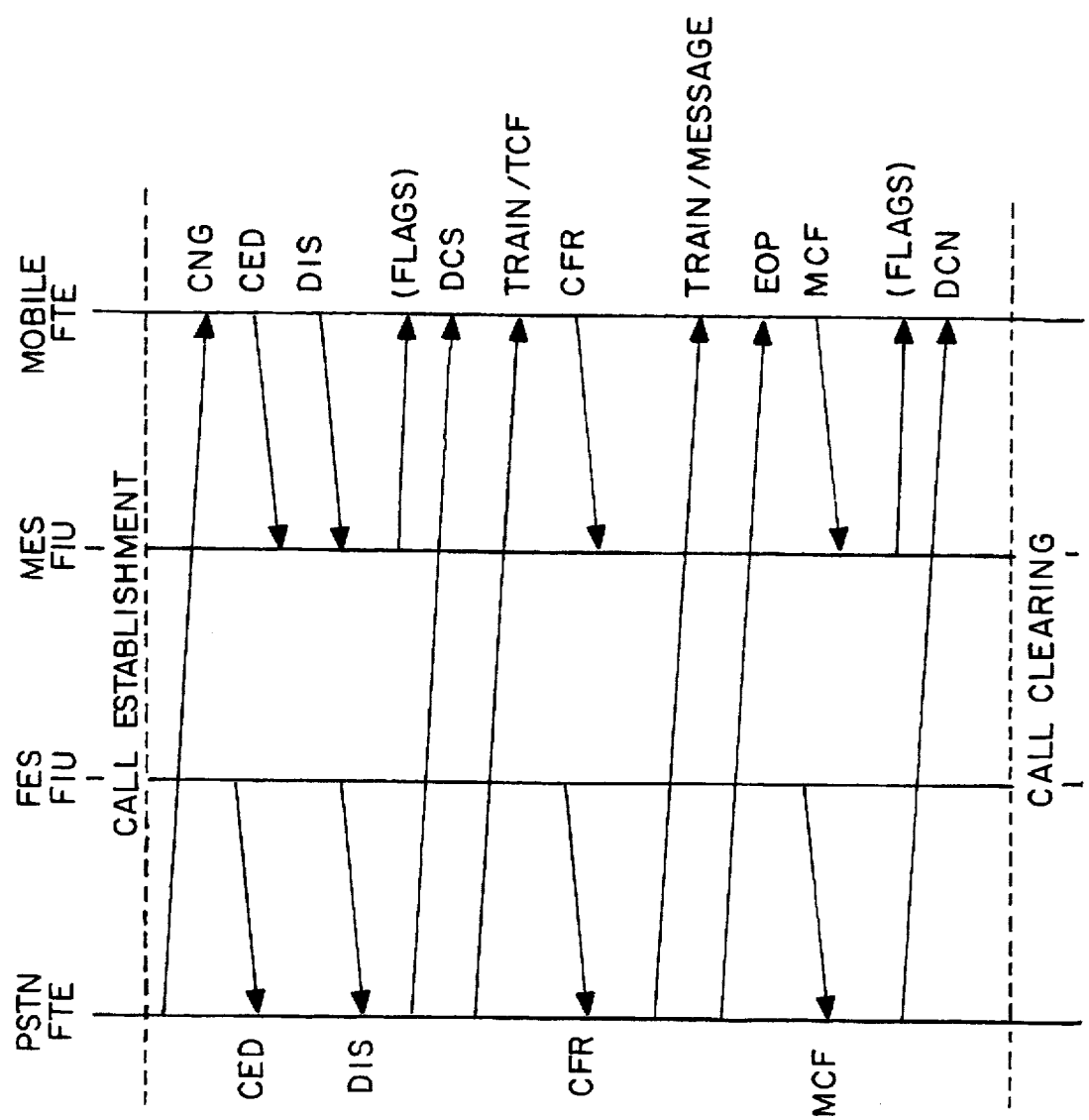
FIG. 7 is an illustrative diagram showing an example of a single-page broadcast call protocol.

An example of the protocol signal exchanges applicable to point-to-multipoint communication, after call-set up, is shown in FIG. 7. From this figure it should be noted that the fixed FIU incorporates a full CCITT T.30 set of protocols because it communicates directly, rather than transparently, with the PSTN (or broadcasting) FTE.

A particular difficulty that is sometimes manifested in broadcast communications is the fact that different mobile FTEs are set to respond to a call using a different number of "rings" thus making calling to the called terminal synchronization difficult, when the DCS signal is not received within the expected "time window" of the mobile terminal.

According to this embodiment, an alternative protocol is provided, which when combined with the "high speed pacifier", permits the "time window" limitation to be eliminated.

Figure 8:
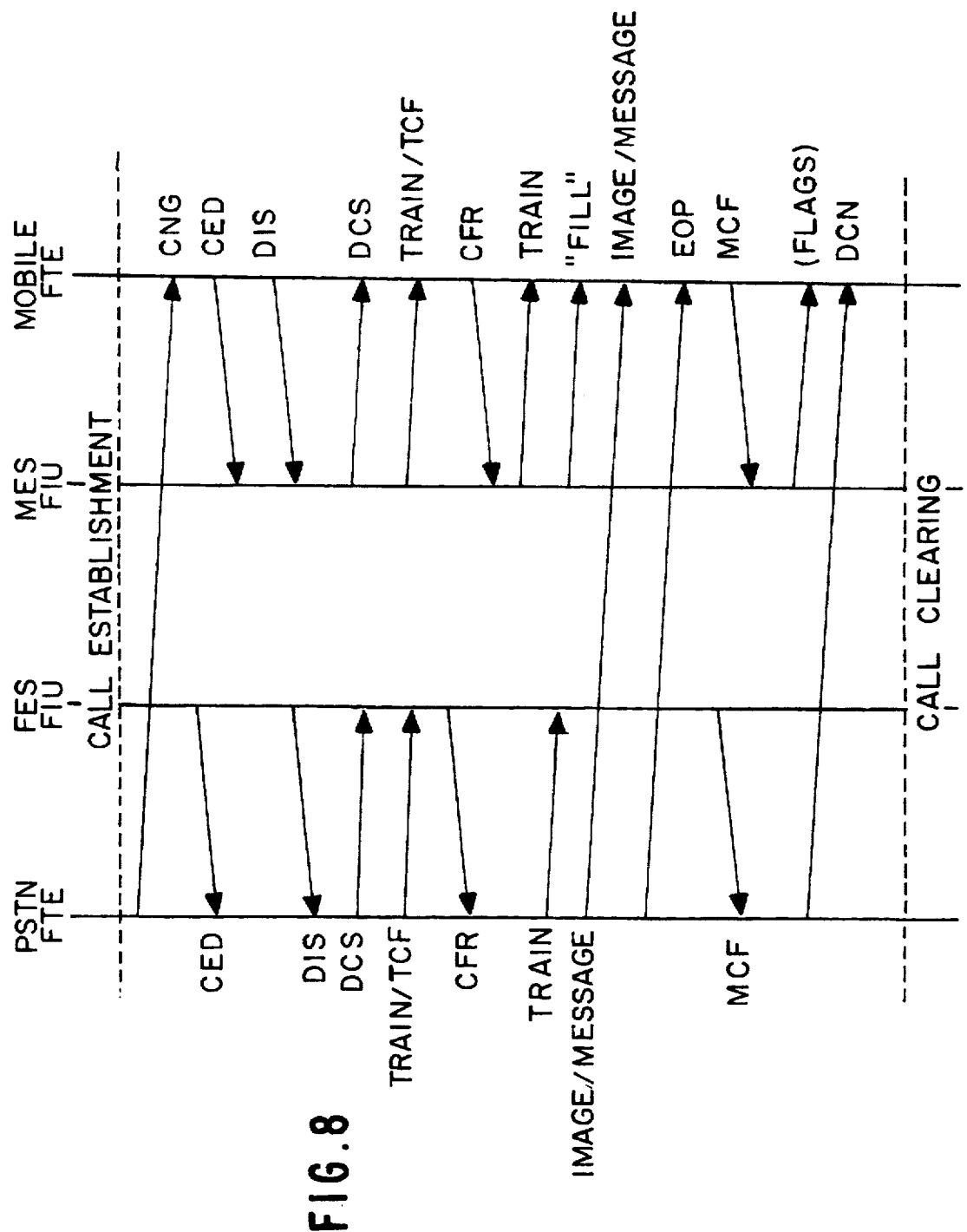
FIG. 8 is an illustrative diagram showing an example of a modified single-page broadcast call protocol.

This protocol is shown in FIG. 8. The key feature of the new broadcast protocol is the coordinated use of capabilities between the fixed-based FIU generated DIS and the mobile-based FIU generated DCS. Typically, this implies that both the FIU generated DIS and the FIU generated DCS signals must convey basic capabilities only.

What is claimed is:

1. A facsimile communication system comprising:
   a first communication station for transmitting baseband signals, said first communication station including a first facsimile interface unit for receiving voiceband facsimile signals and for converting the received voiceband facsimile signals to the baseband signals; and
   a second communication station including a second facsimile interface unit for receiving the transmitted baseband signals, and for converting the received baseband signals to voiceband facsimile signals, wherein said first facsimile interface unit generates a predetermined line control packet in response to at least one predetermined line state transition in the received voice band facsimile signals, and appends to the generated line control packet a predetermined control code identifying at least one of enhanced and proprietary capabilities of said first facsimile interface unit.

2. The facsimile communication system as defined in claim 1, wherein said first facsimile interface unit appends the control code to only two predetermined line control packets.

3. The facsimile communication system as defined in claim 2, wherein one of the two predetermined line control packets identifies a CED connection.

4. The facsimile communication system as defined in claim 3, wherein the other one of the two predetermined line control packets identifies a preamble connection associated with a DIS signal.

5. The facsimile communication system as defined in claim 1, wherein the control code is a uniquely defined 8-bit control octet.

6. The facsimile communication system as defined in claim 1, wherein the control code is a uniquely defined 8-bit control octet.

7. A facsimile communication system comprising:
a first communication station for transmitting baseband signals, said first communication station including facsimile terminal equipment and a first facsimile interface unit for receiving voiceband facsimile signals and for converting the received voiceband facsimile signals to the baseband signals; and
a second communication station including a second facsimile interface unit for receiving the transmitted baseband signals, and for converting the received baseband signals to voiceband facsimile signals;
wherein said second facsimile interface unit is operable to generate, in anticipation of receiving a high speed message signal from the first communication station, a synchronizing sequence followed by FILL characters.

8. The facsimile communication system, as defined in claim 7, wherein the FILL characters are a sequence of binary zeros.

9. A facsimile communication unit comprising:
a communication station for transmitting baseband signals, said communication station including a facsimile interface unit for receiving voiceband facsimile signals and for converting the received voiceband facsimile signals to the baseband signals; and
wherein said facsimile interface unit generates a predetermined line control packet in response to at least one predetermined line state transition in the received voiceband facsimile signals, and appends to the generated line control packet a predetermined control code identifying at least one of enhanced and proprietary capabilities of said facsimile interface unit.

10. The facsimile communication unit as defined in claim 9, wherein said facsimile interface unit appends the control code to only two predetermined line control packets.

11. The facsimile communication unit as defined in claim 10, wherein one of the two predetermined line control packets identifies a CED connection.

12. The facsimile communication unit as defined in claim 11, wherein the other one of the two predetermined line control packets identifies a preamble connection associated with a DIS signal.

13. The facsimile communication unit defined in claim 8, wherein the predetermined control code identifies both enhanced and proprietary capabilities of said facsimile interface unit.

14. The facsimile communication unit as defined in claim 8, wherein the predetermined control identifies the capability of image compression.

15. A method for communicating facsimile signals, comprising:
receiving voiceband facsimile signals;
converting the received voiceband facsimile signals to baseband signals;
generating a predetermined line control packet in response to at least one predetermined line state transition in the received voiceband facsimile signals; and
appending to the generated line control packet a predetermined control code identifying at least one of enhanced and proprietary capabilities.

16. The method as defined in claim 15, wherein the control code is appended to only two predetermined line control packets.

17. The method as defined in claim 16, wherein one of the two predetermined line control packets identifies a CED connection.

18. The method as defined in claim 17, wherein the other one of the two predetermined line control packets identifies a preamble connection associated with a DIS signal.

19. The method as defined in claim 16, wherein one of the two predetermined line control packets is a preamble connection associated with a DCS signal.

20. The method as defined in claim 19, wherein the other one of the two predetermined line control packets is a synchronizing connection associated with a training check signal.

21. A facsimile communication method, comprising:
receiving baseband facsimile signals, and converting the received baseband signals to voiceband facsimile signals; and
generating, in anticipation of receiving a high speed message signal, a synchronizing sequence followed by FILL characters.

22. The facsimile communication method as defined in claim 21, wherein the FILL characters are a sequence of binary zeros.

23. The facsimile communication method as defined in claim 21, further comprising:
receiving, after generating the synchronizing sequence followed by FILL characters, data signals.

24. A facsimile station comprising:
a facsimile interface unit for receiving baseband facsimile signals, and for converting the received baseband facsimile signals to voiceband facsimile signals, said facsimile interface unit being operable, in anticipation of receiving a high speed message signal, for generating a synchronizing sequence followed by FILL characters.

25. The facsimile station as defined in claim 24, wherein the FILL characters are a sequence of binary zeros.

26. A facsimile communication station, comprising:
a facsimile terminal unit for transmitting a CNG signal;
a facsimile interface unit operable for generating at least one of a DIS signal, a confirmation to receive (CFR) signal, and a message confirmation (MCF) signal; and
wherein said facsimile terminal unit receives the generated at least one of DIS, CFR and MCF signals.

27. The facsimile communication station as defined in claim 26, wherein said facsimile interface unit generates the DIS signal and the CFR signal, and wherein said facsimile terminal unit receives the generated DIS and CFR signals.

28. The facsimile communication station as defined in claim 26, wherein said facsimile interface unit generates the DIS, CFR and MCF signals, and said facsimile terminal unit receives the generated DIS, CFR and MCF signals, and wherein the facsimile communication station is a fixed earth station.

29. A mobile earth station comprising:

a facsimile terminal unit; and a facsimile interface unit operable for generating a DCS signal and a training check TCF signal, and wherein said facsimile terminal unit receives the generated CCS signal and training check TCF signal.

30. The mobile earth station as defined in claim 29, wherein said facsimile interface unit is also operable for generating, in anticipation of said facsimile terminal unit, receiving a high speed message signal, a synchronizing sequence followed by FILL characters, and wherein said facsimile terminal unit receives said generated synchronizing sequence and FILL characters.

31. A broadcast facsimile communication system, comprising:

a fixed earth station including a facsimile terminal unit and a facsimile interface unit; and at least one mobile earth station, each of said at least one mobile earth stations comprising a facsimile terminal unit and a facsimile interface unit;

said facsimile interface unit of said fixed earth station being operable for generating a DIS signal and a CFR signal, said facsimile terminal unit receiving said generated DIS and CFR signals.

32. The broadcast facsimile communication system as defined in claim 31, wherein there are a plurality of mobile earth stations, and wherein said fixed earth station is operable to transmit an image message signal to each of said plurality of mobile earth stations.

33. The broadcast facsimile communication system as defined in claim 31, wherein the facsimile terminal unit of said at least one mobile earth station is operable to generate a DCS signal, and a training check TCF signal, and wherein said facsimile terminal unit of said at least one mobile earth station receives the generated DCS signal and training check TCF signal.

34. The broadcast facsimile communication system as defined in claim 31, wherein the facsimile interface unit of said at least one mobile earth station is operable to generate a synchronizing sequence followed by FILL characters, and wherein the facsimile terminal unit of said at least one mobile earth station receives the generated synchronizing sequence followed by the FILL characters.

* * * * *